(12) United States Patent  
Gu et al.

(10) Patent No.: US 9,128,227 B2  
(45) Date of Patent: Sep. 8, 2015

(54) BACKLIGHT MODULE AND DISPLAY APPARATUS

(75) Inventors: Yubo Gu, Shenzhen (CN); Pei Jia, Shenzhen (CN); Liu yang Yang, Shenzhen (CN)

(73) Assignee: SHENZHEN CHINA STAR OPTOELECTRONICS TECHNOLOGY CO. LTD., Shenzhen (CN)

( * ) Notice: Subject to any disclaimer, the term of this patent is extended or adjusted under 35 U.S.C. 154(b) by 0 days.

(21) Appl. No.: 13/636,700

(22) PCT Filed: Aug. 20, 2012

(86) PCT No.: PCT/CN2012/080347  
§ 371 (c)(1),  
(2), (4) Date: Sep. 24, 2012

(87) PCT Pub. No.: WO2014/015547  
PCT Pub. Date: Jan. 30, 2014

(65) Prior Publication Data  
US 2015/0124484 A1    May 7, 2015

(30) Foreign Application Priority Data  
Jul. 26, 2012    (CN) .......................... 2012 1 0261643

(51) Int. Cl.  
*F21V 8/00* (2006.01)  
*G02F 1/1335* (2006.01)

(52) U.S. Cl.  
CPC ............ *G02B 6/0061* (2013.01); *G02B 6/0016* (2013.01); *G02B 6/0021* (2013.01); *G02B 6/0036* (2013.01); *G02F 1/1336* (2013.01); *G02F 1/133603* (2013.01); *G02F 1/133606* (2013.01); *G02F 2001/133607* (2013.01)

(58) Field of Classification Search  
CPC ...................................................... G02B 6/002  
See application file for complete search history.

(56) References Cited  
U.S. PATENT DOCUMENTS  
2011/0090672 A1*    4/2011   Zhu et al. ..................... 362/97.1

* cited by examiner

*Primary Examiner* — Mary Ellen Bowman  
(74) *Attorney, Agent, or Firm* — Mark M. Friedman

(57) ABSTRACT

The present invention provides a backlight module and a display apparatus. The backlight module comprises a substrate, a plurality of light sources disposed on the substrate; and a light guild sheet disposed on the substrate. The light guild sheet includes first recesses and second recesses, and the light sources are received in the first recesses, and the second recesses are formed a light output surface thereof. The present invention can form a uniform plane light source.

5 Claims, 4 Drawing Sheets

BACKLIGHT MODULE AND DISPLAY APPARATUS

FIELD OF THE INVENTION

The present invention relates to a field of a liquid crystal display technology, and more particularly to a backlight module and a display apparatus using the same.

BACKGROUND OF THE INVENTION

Liquid crystal displays (LCDs) have been widely applied in electrical products. Currently, most of LCDs are backlight type LCDs which comprise a liquid crystal panel and a backlight module. According to the position of the backlight source, the backlight module can be a side-light type or a direct-light type in order to provide the liquid crystal panel with backlight. Taking the direct-light type backlight module for example, it uses lamps or light bars to be light sources for providing the liquid crystal panel with backlight.

However, in the side-light type backlight module, the light sources are disposed at one side of a light guild plate, and thus it is required to reserve a space in a bezel of the backlight module for arranging the light sources, adversely hampering a slim bezel design. Moreover, in the direct-light type backlight module, it is required to use numerous light sources to form a plane light source, thereby increasing the cost and energy consumption of the light sources.

As a result, it is necessary to provide a backlight module and a display apparatus to solve the problems existing in the conventional technologies, as described above.

SUMMARY OF THE INVENTION

The invention provides a backlight module and a display apparatus to solve the problem of forming the plane light source existing in the conventional backlight module.

A primary object of the present invention is to provide a backlight module, and the backlight module comprises: a substrate; a plurality of light sources disposed on the substrate; and a light guild sheet disposed on the substrate, wherein the light guild sheet includes a plurality of first recesses and a plurality of second recesses, and the first recesses are formed on a bottom surface of the light guild sheet, and the second recesses are formed on a light output surface of the light guild sheet.

Another object of the present invention is to provide a backlight module, and the backlight module comprises: a substrate; a plurality of light sources disposed on the substrate; and a light guild sheet disposed on the substrate, wherein the light guild sheet includes a plurality of first recesses and a plurality of second recesses, and the first recesses are formed on a bottom surface of the light guild sheet, and the second recesses are formed on a light output surface of the light guild sheet, and there is a first angle between inclined surfaces of the first recesses and the bottom surface, and the first angle is in a range of 90 degrees to 165 degrees, and there is a second angle between inclined surfaces of the second recesses and the light output surface, and the second angle is in a range of 110 degrees to 175 degrees.

Still another object of the present invention is to provide a display apparatus, and the display apparatus comprises a display panel and a backlight module. The backlight module comprises: a substrate; a plurality of light sources disposed on the substrate; and a light guild sheet disposed on the substrate, wherein the light guild sheet includes a plurality of first recesses and a plurality of second recesses, and the first recesses are formed on a bottom surface of the light guild sheet, and the second recesses are formed on a light output surface of the light guild sheet.

In one embodiment of the present invention, the first recesses and/or the second recesses have curved profiles or trapezoid profiles.

In one embodiment of the present invention, one of the second recesses is positioned above one of the first recesses, and a width of each of the second recesses is larger than a width of each of the first recesses.

In one embodiment of the present invention, more than one of the second recesses are positioned above one of the first recesses, and a width of each of the second recesses is less than a width of each of the first recesses.

In one embodiment of the present invention, there is a distance between each two of the second recesses.

In one embodiment of the present invention, the light output surface of the light guild sheet includes a plurality of protruding structures, and the protruding structures are formed between the second recesses.

In one embodiment of the present invention, there is a first angle between inclined surfaces of the first recesses and the bottom surface, and the first angle is in a range of 90 degrees to 165 degrees.

In one embodiment of the present invention, there is a second angle between inclined surfaces of the second recesses and the light output surface, and the second angle is in a range of 110 degrees to 175 degrees.

In one embodiment of the present invention, the light guild sheet further comprises a phosphor layer, and the phosphor layer is formed on an inner surface of each of the first recesses.

The backlight module and the display apparatus of the present invention can use the light guild sheet to uniform the light of the light sources for forming a uniform plane light source. Moreover, with the use of the first recesses and the second recesses of the light guild sheet, the light rays of the light sources can be diffused more laterally to form a more uniform plane light source, and thus it is allowed to decrease the amount of the light sources, so as to decrease the cost and energy consumption of the backlight module.

The structure and the technical means adopted by the present invention to achieve the above and other objects can be best understood by referring to the following detailed description of the preferred embodiments and the accompanying drawings.

DETAILED DESCRIPTION OF THE PREFERRED EMBODIMENTS

Figure 1:
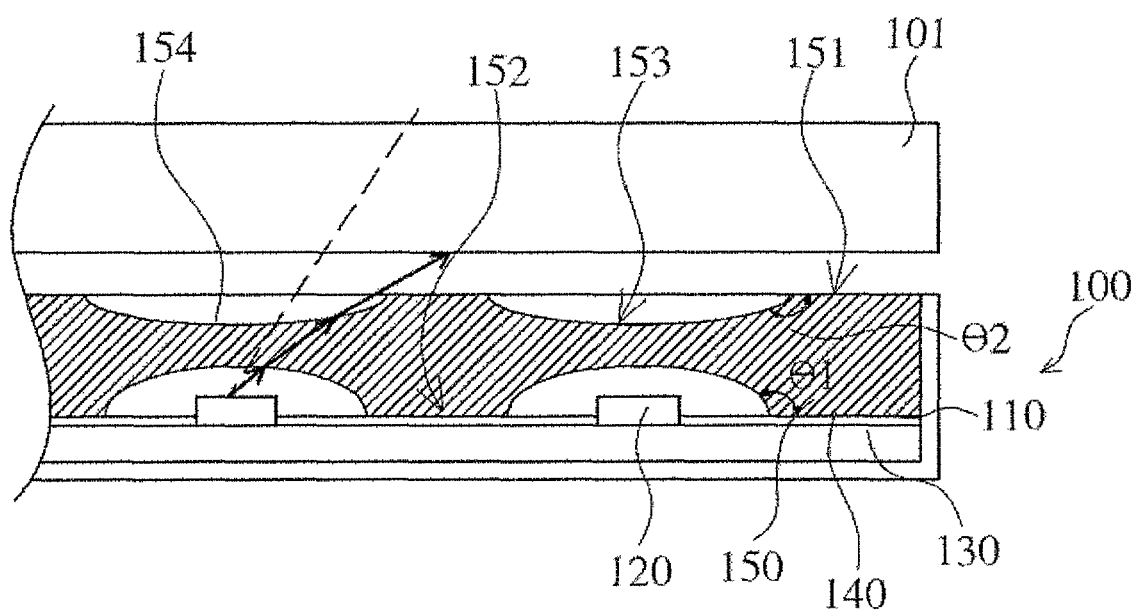
FIG. 1 is a cross-sectional view showing a backlight module and a display panel according to one embodiment of the present invention.

The following embodiments are referring to the accompanying drawings for exemplifying specific implementable embodiments of the present invention. Furthermore, directional terms described by the present invention, such as upper, lower, front, back, left, right, inner, outer, side and etc., are only directions by referring to the accompanying drawings, and thus the used directional terms are used to describe and understand the present invention, but the present invention is not limited thereto.

The drawings and description are to be regarded as illustrative in nature and not restrictive. Like reference numerals designate like elements throughout the specification. In addition, the size and thickness of each component shown in the drawings are arbitrarily shown for understanding and ease of description, but the present invention is not limited thereto.

In the drawings, the thickness of layers, films, panels, regions, etc., are exaggerated for clarity. In the drawings, for understanding and ease of description, the thicknesses of some layers and areas are exaggerated. It will be understood that, when an element such as a layer, film, region, or substrate is referred to as being "on" another element, it can be directly on the other element or intervening elements may also be present.

In addition, in the specification, unless explicitly described to the contrary, the word "comprise" and variations such as "comprises" or "comprising" will be understood to imply the inclusion of stated elements but not the exclusion of any other elements. Furthermore, in the specification, "on" implies being positioned above or below a target element and does not imply being necessarily positioned on the top on the basis of a gravity direction.

Referring to FIG. 1, a cross-sectional view showing a backlight module and a display panel according to one embodiment of the present invention is illustrated. The backlight module 100 of the present embodiment can be disposed opposite to a display panel 101, such as a liquid crystal display (LCD) panel, thereby forming a display apparatus, such an LCD apparatus. The backlight module 100 may comprise a back bezel 110, a plurality of light sources 120, a substrate 130, a reflective layer 140 and a light guild sheet 150.

Referring to FIG. 1 again, the back bezel 110 of the present embodiment may be made of an opaque material, such as plastic, metal or any combination material thereof for carrying the light sources 120, the substrate 130 and the light guild sheet 150. The light sources 120 are disposed on the substrate 130 for providing light to the display panel 101. In this embodiment, the light sources 120 may be point light sources, such as light emitting diodes (LEDs), organic light emitting diodes (OLEDs) or electro-luminescence (EL) devices. In this embodiment, the light sources 120 may be LED chips which are arranged on the substrate 130, and there is a predetermined space between each adjacent two of the light sources 120.

Referring to FIG. 1 again, the substrate 130 may be a rectangular plate. In this embodiment, the substrate 130 may be a circuit board, such as a printed circuit board (PCB) or a flexible printed circuit (FPC), disposed on the back bezel 110 and electrically connected to the light sources 120 for controlling them to emit light.

Referring to FIG. 1 again, the reflective layer 140 can be disposed on a surface of the substrate 130 and formed between or around the light sources 120. The reflective layer 140 may be a reflective plate, a reflective sheet or a reflective coated layer for reflecting light. The reflective layer 140 may be made of a highly reflective material, such as Ag, Al, Au, Cr, Cu, In, Ir, Ni, Pt, Re, Rh, Sn, Ta, W, Mn, any alloy combination thereof, white reflective paint with etiolation-resistant and heat-resistant properties or any combination thereof.

Referring to FIG. 1 again, the light guild sheet 150 may be made as one-piece by using injection molding, extrusion molding, stamping, cutting, casting, machining, compression molding or forging. The material of the light guild sheet 150 may be glass, photo-curable resin, polymethylmethacrylate (PMMA) or polycarbonate (PC). The light guild sheet 150 includes a light output surface 151, a bottom surface 152, a plurality of first recesses 153 and a plurality of second recesses 154. The light output surface 151 is formed at one side of the light guild sheet 150 and faces to the liquid crystal display panel 101 for allowing the light rays of the light sources 120 to be outputted thereto. The bottom surface 152 is formed at another side of the light guild sheet 150 and faces to the substrate 130. The first recesses 153 are formed on the bottom surface 152 for receiving and packaging the light sources 120. An opening width of each of the first recesses 153 is larger than a width of each of the light sources 120 for receiving the light sources 120 therein. The second recesses 154 are formed on the light output surface 151 for diffusing the light rays of the light sources 120. According to a user's practical requirement, the shape or size of the first recesses 153 or the second recesses 154 is adjustable for forming an optimum and uniform plane light source.

In addition, referring to FIG. 1 again, for enhancing a light diffusion effect of the light guild sheet 150, there may be a first angle $\theta 1$ between inclined surfaces or tangent lines of the first recesses 153 and the bottom surface 152, and the first angle $\theta 1$ is in a range of 90 degrees to 165 degrees, for example in a range of 110 degrees to 155 degrees, and there may be a second angle $82$ between inclined surfaces or tangent lines of the second recesses 154 and the light output surface 151, and the second angle $\theta 2$ is in a range of 110 degrees to 175 degrees, for example in a range of 120 degrees to 170 degrees.

Figure 2:
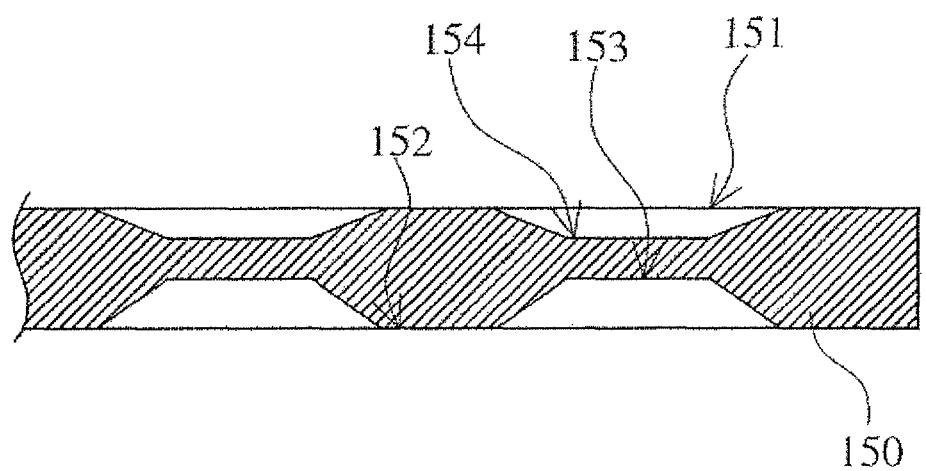
FIG. 2 and FIG. 3 are schematic diagrams showing the light guild sheet according to one embodiment of the present invention.
Figure 3:
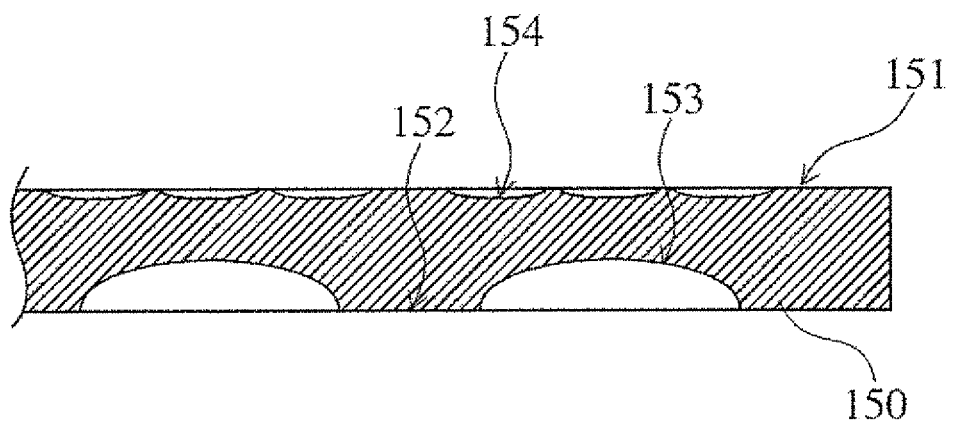

Referring to FIG. 1 through FIG. 3, FIG. 2 and FIG. 3 are schematic diagrams showing the light guild sheet according to one embodiment of the present invention. The first recesses 153 and/or the second recesses 154 may have curved profiles (referring to FIG. 1 and FIG. 3) or trapezoid profiles (referring to FIG. 2), and can act as concave lenses for diffusing the light of the light sources 120. A depth of the first recesses 153 may be greater than a depth of the second recesses 154, such that the light rays from the light sources 120 are emitted through the first recesses 153, so as to enhance the light diffusion effect.

In accordance with the arrangement of the light sources 120, there is a space or distance between each adjacent two of the first recesses 153, and selectively, there may be a space or no space between the second recesses 154. In this case, at least one or numerous second recesses 154 can be positioned above each of the first recesses 153, such that the light rays from the first recesses 153 can be emitted to the second recesses 154 correspondingly. In one embodiment, referring to FIG. 1, one of the second recesses 154 is positioned above one of the first recesses 153, a width (or a diameter) of each of the second recesses 154 can be larger than a width (or a diameter) of each of the first recesses 153. In another embodiment, referring to FIG. 3, more than one of the second recesses 154 are positioned above one of the first recesses 153, and the width (or a diameter) of each of the second recesses 154 can be less than the width (or a diameter) of each of the first recesses 153, and an arrangement area of the more than one second recesses 154 can larger than an opening size of each of the first recesses 153.

Referring to FIG. 1 again, when the light sources 120 emit light, the light rays of the light sources 120 can be diffused and uniformed by the first recesses 153 of the light guild sheet 150 for mixing light. When the light rays are emitted from the second recesses 154 on the light output surface 151, the light rays can be further diffused, thereby providing a more uniform plane light source to the liquid crystal display panel 101. With the use of the first recesses 153 and the second recesses 154 of the light guild sheet 150, the light rays of the light sources 120 can be diffused more laterally, and thus the space or distance between the light sources 120 can increase. That is, it is allowed to decrease the amount of the light sources 120, so as to decrease the cost and energy consumption of the backlight module 100.

Figure 4:
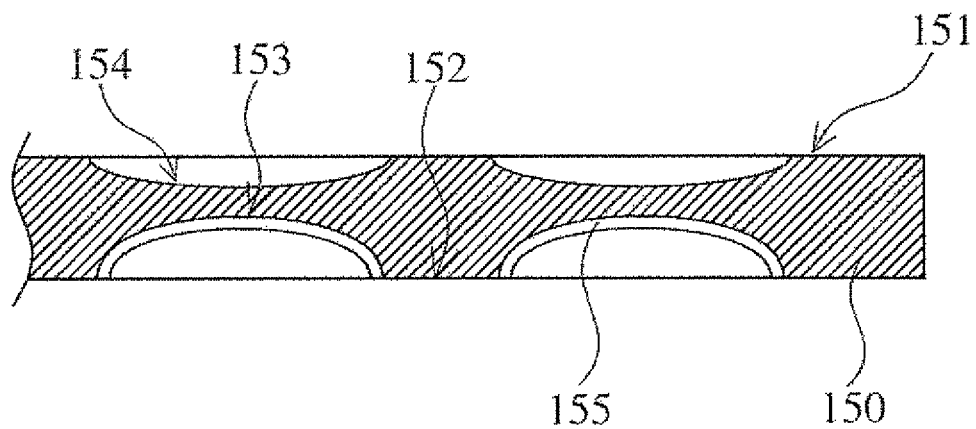
FIG. 4 is a partially cross-sectional view showing a light guild sheet according to another embodiment of the present invention.

Referring to FIG. 4, a partially cross-sectional view showing a light guild sheet according to another embodiment of the present invention is illustrated. In another embodiment, the light guild sheet 150 can further comprise a phosphor layer 155. The phosphor layer 155 is formed on an inner surface of each of the first recesses 153 and excited by the light of the light sources 120 to emit a visible light. Therefore, the luminous efficiency or light color of the light sources 120 can be improved by using the phosphor layer 155.

When assembling the display apparatus of the present embodiment, the substrate 130 with the light sources 120 arranged thereon is first disposed on the back bezel 110. Subsequently, the light guild sheet 150 can be disposed on the substrate 130. At this time, the light sources 120 are correspondingly received and packaged in the first recesses 153 of the light guild sheet 150. Subsequently, the display panel 101 is disposed above the light guild sheet 150, so as to achieve the display apparatus.

Therefore, with the use of the light guild sheet 150 of the present embodiment, the light of the light sources 120 of the backlight module 100 can be uniformed for forming a uniform plane light source. The light of the light sources 120 is pre-mixed by the concave lenses of the light guild sheet 150, thereby reducing the required light mixing space and a thickness of the backlight module 100. Furthermore, with the use of the first recesses 153 and the second recesses 154, the light rays of the light sources 120 can be diffused more laterally to form a more uniform plane light source for decreasing the amount of the light sources 120, so as to decrease the cost and energy consumption of the backlight module 100.

Figure 5:
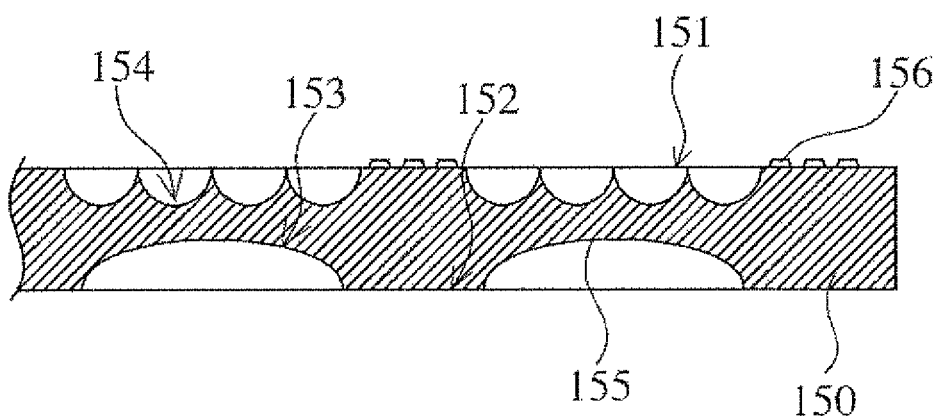
FIG. 5 is a partially cross-sectional view showing a light guild sheet according to still another embodiment of the present invention.

Referring to FIG. 5, a partially cross-sectional view showing a light guild sheet according to still another embodiment of the present invention is illustrated. In still another embodiment, the light output surface 151 of the light guild sheet 150 can include a plurality of protruding structures 156 to modify the direction of light rays, thereby condensing light and enhancing the brightness thereof, wherein the protruding structures 156 may be prism-shaped structures or semicircular structures. Furthermore, the light output surface 151 may include a cloudy surface or a plurality of scattering patterns to uniform the light rays outputted from the light sources 120. That is, the mora situation can be mitigated. Moreover, the protruding structures 156 may be formed between the second recesses 154 for enhancing brightness, thereby enhancing the brightness between the light sources 120, as well as improving a backlight uniformity.

As described above, the backlight module and the display apparatus of the present invention can use the light guild sheet to uniform the light rays from the light sources for forming the uniform plane light source. In addition, with the use of the first recesses and the second recesses of the light guild sheet, the light rays of the light sources can be diffused more laterally to form a more uniform plane light source, and thus it is allowed to decrease the amount of the light sources, so as to decrease the cost and energy consumption of the backlight module.

The present invention has been described with a preferred embodiment thereof and it is understood that many changes and modifications to the described embodiment can be carried out without departing from the scope and the spirit of the invention that is intended to be limited only by the appended claims.

The invention claimed is:

1. A backlight module, comprising:
   a substrate;
   a plurality of light sources disposed on the substrate; and
   a light guide sheet disposed on the substrate, wherein the light guide sheet includes a plurality of first recesses and a plurality of second recesses, and the first recesses are formed on a bottom surface of the light guide sheet, and the second recesses are formed on a light output surface of the light guide sheet, and there is a first angle between inclined surfaces of the first recesses and the bottom surface, and the first angle is in a range of 90 degrees to 165 degrees, and there is a second angle between inclined surfaces of the second recesses and the light output surface, and the second angle is in a range of 110 degrees to 175 degrees;
   wherein more than one of the second recesses are positioned above one of the first recesses. and a width of each of the second recesses is less than a width of each of the first recesses, and an arrangement area of the more than one second recesses is larger than an opening size of each of the first recesses;
   wherein, the light output surface of the light guide sheet includes a plurality of protruding structures, and the protruding structures are formed between the second recesses;
   wherein, the light guide sheet further comprises a phosphor layer, and the phosphor layer is formed on an inner surface of each of the first recesses.

2. The backlight module according to claim 1, wherein the first recesses and/or the second recesses have curved profiles or trapezoid profiles.

3. A backlight module, comprising:
   a substrate;
   a plurality of light sources disposed on the substrate; and
   a light guide sheet disposed on the substrate, wherein the light guide sheet includes a plurality of first recesses and a plurality of second recesses, and the first recesses are formed on a bottom surface of the light guide sheet, and the second recesses are formed on a light output surface of the light guide sheet;
   wherein more than one of the second recesses are positioned above one of the first recesses and a width of each of the second recesses is less than a width of each of the first recesses, and an arrangement area of the more than one second recesses is larger than an opening size of each of the first recesses;
   wherein the light output surface of the light guide sheet includes a plurality of protruding structures, and the protruding structures are formed between the second recesses;
   wherein, the light guide sheet further comprises a phosphor layer, and the phosphor layer is formed on an inner surface of each of the first recesses.

4. The backlight module according to claim 3, wherein the first recesses and/or the second recesses have curved profiles or trapezoid profiles.

5. A display apparatus, comprising:
   a display panel; and
   a backlight module comprising:
      a substrate;

a plurality of light sources disposed on the substrate; and a light guide sheet disposed on the substrate, wherein the light guide sheet includes a plurality of first recesses and a plurality of second recesses, and the first recesses are formed on a bottom surface of the light guide sheet, and the second recesses are formed on a light output surface of the light guild guide sheet;

wherein more than one of the second recesses are positioned above one of the first recesses, and a width of each of the second recesses is less than a width of each of the first recesses, and an arrangement area of the more than one second recesses is larger than an opening size of each of the first recesses;

wherein, the light output surface of the light guide sheet includes a plurality of protruding structures, and the protruding structures are formed between the second recesses;

wherein, the light guide sheet further comprises a phosphor and the phosphor layer is formed on an inner surface of each of the first recesses.

* * * * *